United States Patent
Sawada et al.

(10) Patent No.: US 11,267,958 B2
(45) Date of Patent: Mar. 8, 2022

(54) LATEX COMPOSITION, SHAPED OBJECT OBTAINED THEREFROM, AND METHOD FOR PRODUCING SAID SHAPED OBJECT

(71) Applicant: SUMITOMO SEIKA CHEMICALS CO., LTD., Hyogo (JP)

(72) Inventors: Kouhei Sawada, Himeji (JP); Hiromasa Miyazaki, Himeji (JP); Norihiro Sugihara, Osaka (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 0 days.

(21) Appl. No.: 16/640,559

(22) PCT Filed: Aug. 20, 2018

(86) PCT No.: PCT/JP2018/030626
§ 371 (c)(1),
(2) Date: Feb. 20, 2020

(87) PCT Pub. No.: WO2019/039424
PCT Pub. Date: Feb. 28, 2019

(65) Prior Publication Data
US 2020/0190295 A1   Jun. 18, 2020

(30) Foreign Application Priority Data
Aug. 21, 2017   (JP) .............................. JP2017-158778

(51) Int. Cl.
| | |
|---|---|
| C08L 9/10 | (2006.01) |
| A41D 19/00 | (2006.01) |
| B29C 41/14 | (2006.01) |
| C08K 5/00 | (2006.01) |
| C08K 5/31 | (2006.01) |
| C08K 5/39 | (2006.01) |
| A41D 19/04 | (2006.01) |
| C08C 19/20 | (2006.01) |
| C09J 5/02 | (2006.01) |

(52) U.S. Cl.
CPC ............. *C08L 9/10* (2013.01); *A41D 19/00* (2013.01); *A41D 19/0055* (2013.01); *A41D 19/04* (2013.01); *B29C 41/14* (2013.01); *C08C 19/20* (2013.01); *C08K 5/0025* (2013.01); *C08K 5/31* (2013.01); *C08K 5/39* (2013.01); *C09J 5/02* (2013.01)

(58) Field of Classification Search
CPC .... A41D 19/0055; A41D 19/00; A41D 19/04; B29C 41/14; C08K 5/0025; C08K 5/31; C08K 5/39; C08L 9/10
See application file for complete search history.

(56) References Cited

U.S. PATENT DOCUMENTS

| | | | |
|---|---|---|---|
| 2009/0234064 A1* | 9/2009 | Wang | ................... C08K 5/0008 524/552 |
| 2013/0237637 A1 | 9/2013 | Katou et al. | |
| 2014/0187693 A1 | 7/2014 | Tsuji | |

FOREIGN PATENT DOCUMENTS

| | | |
|---|---|---|
| CN | 102146171 A | 8/2011 |
| CN | 102718994 A | 10/2012 |
| CN | 103189423 A | 7/2013 |
| EP | 0 141 473 A1 | 5/1985 |
| JP | S60-168728 A | 9/1985 |
| JP | 2004-532752 A | 10/2004 |
| JP | 2009-209229 A | 9/2009 |
| JP | 2012-246334 A | 12/2012 |
| JP | 2013-129761 A | 7/2013 |
| JP | 2016-160365 A | 9/2016 |
| JP | 2016-160366 A | 9/2016 |
| WO | 02/090430 A1 | 11/2002 |

OTHER PUBLICATIONS

Author Unknown, RheinChemie Additives Technical Data Sheet for Rhenocure 1000 C, from website https://rch.lanxess.com/products/rubber-additives-2/specialty-and-standard-chemicals/accelerators?lang=en, Aug. 10, 2017, pp. 1-2.*
Author Unknown, RheinChemie Additives Technical Data Sheet for Rhenocure ZEPC, from website https://rch.lanxess.com/products/rubber-additives-2/specialty-and-standard-chemicals/accelerators?lang=en, Aug. 10, 2017, pp. 1-2.*
International Search Report of PCT/JP2018/030626 dated Oct. 23, 2018.

* cited by examiner

*Primary Examiner* — Patrick D Niland
(74) *Attorney, Agent, or Firm* — Sughrue Mion, PLLC

(57) ABSTRACT

The polyisoprene-containing latex composition of the present it comprises the following components (a) and (b):
(a) zinc ethylphenyldithiocarbamate; and
(b) 1-o-tolylbiguanide.
Thus, a molded article of the latex composition has high tensile strength. Further, even after the latex composition is stored for a longer period of time than before, a decrease in the tensile strength of the obtained molded article is suppressed.

7 Claims, No Drawings

LATEX COMPOSITION, SHAPED OBJECT OBTAINED THEREFROM, AND METHOD FOR PRODUCING SAID SHAPED OBJECT

CROSS REFERENCE TO RELATED APPLICATIONS

This application is a National Stage of International Application No. PCT/JP2018/030626 filed Aug. 20, 2018, claiming priority based on Japanese Patent Application No. 2017-158778 filed Aug. 21, 2017.

TECHNICAL FIELD

The present invention relates to a latex composition, a molded article of the latex composition, and a method for producing the molded article.

BACKGROUND ART

Polyisoprene latex is known as a rubber latex in which polyisoprene is emulsified and dispersed in a medium, and its application has been developed for various uses. This polyisoprene latex is an indispensable material as a raw material for producing molded articles such as artificial nipples, balloons, gloves, finger cots, and films.

When a molded article of a polyisoprene latex is obtained, vulcanization of the polyisoprene latex is commonly performed for the purpose of imparting strength and elasticity to the molded article. In vulcanizing a polyisoprene latex, an additive such as a vulcanization accelerator and; or a vulcanization acceleration aid is used in addition to a vulcanizing agent. These additives are usually used in small amounts in order not to impair the performance of the polyisoprene latex. For example, Patent Literature 1 discloses a synthetic polyisoprene latex composition comprising a synthetic polyisoprene latex, a sulfur-based vulcanizing agent, a zinc oxide, and a vulcanization accelerator; and further discloses that zinc dibenzyldithiocarbamate, which is a vulcanization accelerator, is used in a small amount. Such a composition is considered to be excellent in safety and in tensile strength of the resulting molded article.

CITATION LIST

Patent Literature

PTL 1: JP2009-209229A

SUMMARY OF INVENTION

Technical Problem

The process in which a polyisoprene-containing latex composition is vulcanized to obtain a molded article is performed after transportation and storage of the composition for, for example, about 1 day, following the production of the composition. In the process of obtaining a molded article, the composition may be used continuously for, for example, about 2 weeks. That is, the latex composition may be vulcanized after about 1 day to 2 weeks following the production of the composition to obtain a molded article. A molded article obtained by vulcanizing the latex composition 1 day after the production of the composition has high tensile strength. However, a molded article obtained after a period of time longer than 1 day (for example, 8 days or more) following the production of the composition has a problem in that the molded article has decreased tensile strength compared to that of the molded article obtained 1 day after the production of the composition.

The present invention has been accomplished in view of the above. An object of the present invention is to provide a latex composition in which a decrease in the tensile strength of a molded article is suppressed even when the molded article is obtained after a period of time longer than 1 day following the production of the latex composition. Another object of the present invention is to provide a molded article of the latex composition, and a method for producing the molded article.

Solution to Problem

The present inventor conducted extensive research to achieve the above objects, and found that the objects can be achieved by incorporating specific components into a latex composition. The present invention has been accomplished based on this finding.

Specifically, the present invention includes, for example, the inventions described in the following items.

Item 1. A polyisoprene-containing latex composition comprising the following component (a) and component (b):
(a) zinc ethylphenyldithiocarbamate; and
(b) 1-o-tolylbiguanide.

Item 2. The latex composition according to Item 1, wherein the content of the component (a) is 0.3 to 0.6 parts by mass per 100 parts by mass of polyisoprene.

Item 3. The latex composition according to Item 1 or 2, wherein the content of the component (b) is 0.6 to 0.9 parts by mass per 100 parts by mass of polyisoprene.

Item 4. The latex composition according to any one of Items 1 to 3, wherein the total content of the component. (a) and the component (10) is 0.9 to 1.5 parts by mass per 100 parts by mass of polyisoprene.

Item 5. The latex composition according to any one of Items 1 to 4, wherein the content of the component (a) is 33 to 100 parts by mass per 100 parts by mass of the component. (3).

Item 6. A molded article comprising a vulcanizate of the latex composition according to any one of Items 1 to 5.

Item 7. A method for producing a molded article, comprising vulcanizing the Latex composition according to any one of Items 1 to 5 to obtain a molded article.

Advantageous Effects of Invention

The latex composition according to the present invention enables suppression of a decrease in the tensile strength of a molded article, even when the molded article is obtained after a period of tame longer than 1 day following the production of the latex composition.

DESCRIPTION OF EMBODIMENTS

Embodiments of the present invention are described in detail below in the present specification, the terms "comprise" and "contain" include the concepts of "comprise," "contain," "consist essentially of," and "consist of."

The polyisoprene-containing latex composition of the present invention comprises the following components (a) and (b):
(a) zinc ethylphenyldithiocarbamate; and
(b) 1-o-tolylbiguanide.

In the following description, the polyisoprene-containing latex composition of the present invention is referred to as "the latex composition."

The polyisoprene contained in the latex composition is, for example, a synthetic isoprene polymer obtained by polymerizing isoprene. The type of synthetic isoprene polymer is not particularly limited.

The synthetic isoprene polymer may be a copolymer containing isoprene, and one or more other ethylenically unsaturated monomers copolymerizable with isoprene. In this case, the content of the isoprene unit is preferably 70 mass % or more, more preferably 90 mass % or more, and particularly preferably 95 mass % or more. The other ethylenically unsaturated monomers copolymerizable with isoprene are not particularly limited, and various known ethylenically unsaturated monomers can be used.

When the polyisoprene is a synthetic isoprene polymer for example, a known synthetic isoprene polymer latex can be used for the latex composition of the present invention. That is, the latex composition may contain a known synthetic isoprene polymer latex The solids concentration of the synthetic isoprene polymer latex may be preferably 40 wt % or more, more preferably 40 to 70 wt %, and even more preferably 50 to 70 wt %.

The dispersion medium for use in the synthetic isoprene polymer latex is not particularly limited. For example, water can be mentioned as a dispersion medium in terms of excellent dispersibility of the polyisoprene. The dispersion medium may also be a mixed solvent of an organic solvent and water, as long as the dispersion stability of the polyisoprene is not impaired. Examples of organic solvents include lower alcohols such as methanol, ethanol, and isopropyl alcohol; and the like. As the organic solvent, only one organic solvent may be used, or a mixed solvent of two or more organic solvents may be used.

The shape of the polyisoprene is not particularly limited. For example, the polyisoprene may be in a particulate form. When the polyisoprene is in a particulate form, the polyisoprene may be, for example, spherical particles, ellipsoidal particles, or particles having an irregularly distorted irregular shape.

The average particle diameter of the polyisoprene is not particularly limited, and is preferably 0.6 to 3.0 μm, and more preferably 0.8 to 2.0 μm.

The production method for the polyisoprene is also not particularly limited, and various known methods for producing polyisoprene can be used. The synthetic isoprene polymer latex can be produced by the method described in, for example, JP2016-160365A or 022016-160366A.

The component (a) is zinc ethylphenyldithiocarbamate. The component (a) has a function as, for example, a vulcanization accelerator in the latex composition.

The component (a) may be, for example, in a particulate form. The component (a) may be in any other form. When the component (a) is in a particulate form, the component (a) may take any of a variety of shapes, such as a spherical shape, an ellipsoidal shape, and an irregularly distorted irregular shape.

When the component (a) is spherical, the volume average particle diameter of the component (a) is not particularly limited; and is, for example, 0.01 to 10 μm. In this case, the volume average particle diameter of the component (a) is more preferably 0.01 to 5 μm, even more preferably 0.5 to 4 μm, and still even more preferably 0.75 to 3.3 μm, from the viewpoint of aggregates being less likely to be formed in the latex composition and a decrease in the tensile strength of a molded article obtained from the latex composition being suppressed.

The content of the component (a) in the latex composition is preferably 0.3 to 0.6 parts by mass, and more preferably 0.3 to 0.4 parts by mass, per 100 parts by mass of polyisoprene. In this case, a molded article obtained from the latex composition has excellent tensile strength. Further, even in a molded article obtained after a period of time longer than 1 day following the production of the latex composition, a decrease in the tensile strength is suppressed.

The component (b) is 1-o-tolylbiguanide. The component (b) has a function as, for example, a vulcanization accelerator in the latex composition.

The component (b) may be, for example, in a particulate form. The component (b) may be in any other form. When the component (b) is in a particulate form, the component (b) may take any of a variety of shapes, such as a spherical shape, an ellipsoidal shape, and an irregularly distorted irregular shape.

When the component (b) is spherical, the volume average particle diameter of the component (b) is not particularly limited, and is, for example, 0.01 to 10 μm. In this case, the volume average particle diameter of the component (b) is more preferably 0.01 to 5 μm, even more preferably 0.5 to 4 μm, and still even more preferably 0.75 to 3.3 μm, from the viewpoint of aggregates being less likely to be formed in the latex composition and a decrease in the tensile strength of a molded article obtained from the latex composition being suppressed.

The content of the component (5) in the latex composition is preferably 0.6 to 0.9 parts by mass, and more preferably 0.8 to 0.9 parts by mass, per 100 parts by mass of polyisoprene. In this case, a molded article obtained from the latex composition has excellent tensile strength. Further, even in a molded article obtained after a period of time longer than 1 day following the production of the latex composition, a decrease in the tensile strength is suppressed.

The total content of the component (a) and the component (b) in the latex composition is preferably 0.9 to 1.5 parts by mass, and more preferably 1.1 to 1.3 parts by mass, per 100 parts by mass of polyisoprene. In this case, a molded article obtained from the latex composition has excellent tensile strength. Further, even in a molded article obtained after a period of time longer than 1 day following the production of the latex composition, a decrease in the tensile strength is suppressed.

It is particularly preferred that the total content of the component (a) and the component (b) be 0.9 to 1.5 parts by mass (preferably 1.1 to 1.3 parts by mass) per 100 parts by mass of polyisoprene; that the content of the component (a) be 0.3 to 0.6 parts by mass (preferably 0.3 to 0.4 parts by mass) per 100 parts by mass of polyisoprene; and that the content of the component (b) be 0.6 to 0.9 parts by mass (preferably 0.8 to 0.9 parts by mass) per 100 parts by mass of polyisoprene. In this case, a decrease in the tensile strength of a molded article obtained after a period of time longer than 1 day following the production of the latex composition is further suppressed.

From another viewpoint, the content of component (a) is preferably 33 to 100 parts by mass, and particularly preferably 33 to 50 parts by mass, per 100 parts by mass of the component (b). In this case, a decrease in the tensile strength of a molded article obtained after a period of time longer than 1 day following the production of the latex composition is further suppressed.

When the content of the component (a) is 33 to 100 parts by mass per 100 parts by mass of the component (b), it is also preferred that the total content of the component (a) and the component (b) be 0.9 to 1.5 parts by mass (preferably 1.1 to 1.3 parts by mass) per 100 parts by mass of polyisoprene. Moreover, when the content of the component (a) is 33 to 100 parts by mass per 100 parts by mass of the component (b), it is also preferred that the content of the component (a) be 0.3 to 0.6 parts by mass (preferably 0.3 to 0.4 parts by mass) per 100 parts by mass of polyisoprene, and that the content of the component (b) be 0.6 to 0.9 parts by mass (preferably 0.8 to 0.9 parts by mass) per 100 parts by mass of polyisoprene.

The component (a) and the component (b) can both be produced by known methods. As the component (a) and the component (b), commercially available products are also usable in the latex composition of the present invention.

In the latex composition of the present invention, the dispersion medium is not particularly limited; and may be, for example, the same as the dispersion medium for use in the synthetic isoprene polymer latex described above.

The solids concentration of the latex composition is not particularly limited. For example, from the viewpoint of separation and aggregation of polyisoprene particles after long-term storage of the latex composition being less likely to occur, the solids concentration of the latex composition is preferably 20 to 70 mass %, and more preferably 30 to 60 mass %.

The latex composition may contain additives in addition to the polyisoprene, the component (a), and the component (b). For example, various additives contained in known isoprene latexes can be used as additives that can be contained in the latex composition.

Examples of additives that can be contained in the latex composition include vulcanizing agents, vulcanization accelerators, vulcanization acceleration aids, stabilizers, pH adjusters, antioxidants, and the like.

Examples of vulcanizing agents include sulfur-based vulcanizing agents. Examples of sulfur-based vulcanizing agents include sulfur such as powdered sulfur, sublimed sulfur, precipitated sulfur, colloidal sulfur, surface-treated sulfur, and insoluble sulfur; and sulfur-containing compounds such as sulfur chloride, sulfur dichloride, morpholine-disulfide, alkylphenol-disulfide, N,N'-dithio-bis (hexahydro-2H-azepinone-2), phosphorus-containing polysulfide, high-molecular-weight polysulfides, and 2-(4'-morpholinodithio)benzothiazole. The vulcanizing agents may be used singly, or in a combination of two or more. Among these sulfur-based vulcanizing agents, sulfur is preferable, and colloidal sulfur is more preferable.

In order to improve the dispersibility of a vulcanizing agent, additives such as potassium oleate and sodium β-naphthalene sulfonic acid formalin condensate may be used in combination with the vulcanizing agent. The additives may be used singly, or in a combination of two or more.

The amount of vulcanizing agent is preferably 0.1 to 10 parts by mass, and more preferably 1 to 5 parts by mass, per 100 parts by mass of polyisoprene (solids content), from the viewpoint of a molded article with excellent tensile strength being obtained without impairing the dispersion stability of the latex composition.

As vulcanization accelerators, various known vulcanization accelerators can be used in addition to the component (a) and the component (b), as long as the effect of the present invention is not impaired.

The type of vulcanization acceleration aid is not particularly limited; and various known vulcanization acceleration aids, such as zinc oxide, can be used. When zinc oxide is used as a vulcanization acceleration aid, a zinc oxide dispersion containing stabilizers such as sodium β-naphthalene sulfonic acid formalin condensate and potassium oleate may be used.

The amount of vulcanization acceleration aid may be preferably 0.1 to 1 part by mass, and more preferably 0.1 to 0.5 parts by mass, per 100 parts by mass of polyisoprene (solids content), from the viewpoint of a molded article with excellent tensile strength being obtained without impairing the dispersion stability of the latex composition.

There is no limitation on the pH adjusters. Examples include known acids and alkalis. From the viewpoint of the stability of the latex composition being readily improved, alkalis are preferable. Examples of alkalis include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; organic amine compounds such as trimethylammonium and triethanolamine; and the like. When the latex composition contains a pH adjuster, it is preferred that the composition contains the pH adjuster so that the pH of the latex composition is, for example, about 7 or more, and preferably about 8 or more.

Examples of stabilizers include milk proteins and salts thereof; anionic surfactants such as sodium lauryl sulfate; sorbitan fatty acid esters; and the like. Examples of milk protein salts include casein metal salts. Examples of metal salts in casein metal salts include alkali metal salts, alkaline earth metal salts, and the like; and various metals that can form salts can also be used. Specific examples of casein metal salts include casein sodium salt, casein potassium salt, casein manganese salt, zinc caseinate, and the like. Other examples of stabilizers include sodium lauryl sulfate, sodium dodecylbenzenesulfonate, sorbitan fatty acid ester surfactants (e.g., polyoxyethylene sorbitan fatty acid esters), and the like.

The amount of stabilizer may be preferably 0.1 to 1 part by mass, and more preferably 0.2 to 0.7 parts by mass, per 100 parts by mass of polyisoprene (solids content), from the viewpoint of a molded article with excellent tensile strength being obtained without impairing the dispersion stability of the latex composition.

Various known antioxidants, such as 2,2'-methylenebis(4-methyl-6-tert-butylphenol), can be used as antioxidants. In order to improve the dispersibility of an antioxidant, additives such as potassium oleate and sodium polycarboxylate may be used in combination with the antioxidant.

The amount of antioxidant may be preferably 0.5 to 4 parts by mass, and more preferably 1 to 3 parts by mass, per 100 parts by mass of polyisoprene (solids content), from the viewpoint of a molded article with excellent tensile strength being obtained without impairing the dispersion stability of the latex composition.

Each respective additive described above that can be contained in the latex composition may contain only one kind of the respective additive, or two or more different kinds of the respective additive.

The method for preparing the latex composition is not particularly limited, and various known preparation methods can be used. An example of the method for preparing the latex composition is a method in which the polyisoprene, the component (a), and the component. (b), and one or more additives added as necessary are mixed in predetermined proportions using a known mixer or dispersion machine such as a ball mill, a kneader, or a disperser.

In preparing the latex composition, the synthetic isoprene polymer latex described above can be used as a raw material for the polyisoprene.

In preparing the latex composition, the component (a) and the component (b) may be in the form of a dispersion or a solution. When the component (a) and the component. (b) are each a dispersion or a solution, the solvent is preferably water. When the component (a) and the component (b) are dispersions, the dispersions may contain additives such as potassium oleate and sodium polycarboxylate, in order to improve the dispersibility of the component (a) and the component (b).

The latex composition can be vulcanized to form a vulcanizate. For example, a molded article containing a vulcanizate can be obtained by vulcanizing the latex composition in a mold having a specific shape or the like.

Since a molded article containing a vulcanizate of the latex composition is formed using the latex composition, the molded article has excellent tensile strength. In particular, the latex composition contains the specific components; therefore, even if a molded article is obtained after a period of time longer than 1 day following the production of the latex composition, a decrease in the tensile strength of the obtained molded article is suppressed.

The storage conditions for the latex composition are not particularly limited. For example, the latex composition may be stored in such a manner that the composition is allowed to stand under an environment at 25° C. The latex composition is preferably stored in, for example, a dark place.

The molded article contains a vulcanizate of the latex composition in an amount of 50 mass % or more, preferably 80 mass % or more, even more preferably 90 mass % or more, and particularly preferably 99 mass % or more, based on the total mass of the molded article. The molded article may consist of only a vulcanizate of the latex composition.

The production method for the molded article is not particularly limited. For example, a production method comprising vulcanizing the latex composition of the present invention to obtain a molded article may be employed.

As the process for vulcanizing the latex composition, various known processes can be used. An example of the process for vulcanizing the latex composition is a coagulation dipping process in which, for example, a ceramic plate is dipped in a coagulant solution to attach the coagulant; and the ceramic plate is then dipped in a polyisoprene latex composition, and heated. Other examples of the process for vulcanizing the latex composition include a casting process in which a polyisoprene latex composition is poured into a smooth mold made of, for example, glass, and heated; and the like.

The coagulant is not particularly limited. Examples include metal halides such as barium chloride, calcium, chloride, and magnesium chloride; nitrates such as barium nitrate and calcium nitrate; acetates such as barium acetate, calcium acetate, and zinc acetate; carbonates such as calcium carbonate; and the like. The coagulant may be used in the form of, far example, an aqueous solution or an aqueous dispersion. The coagulants may be used singly, or in a combination of two or more.

The latex composition may be vulcanized at, for example, 100 to 140° C., more preferably 100 to 120° C.

The production method for the molded article according to the present invention may comprise, after obtaining a molded article by vulcanization, a step of, for example, drying the molded article by an appropriate process.

By the above production method, a molded article of the latex composition formed into a desired shape can be obtained.

The shape of the molded article is not particularly limited. For example, the molded article can take a shape such as a thin film, a substrate, a film, a rod, a block, or a fiber.

The latex composition and molded article of the present invention have a range of applications, and are particularly suitable for artificial nipples, balloons, gloves, finger cots, films, and the like.

EXAMPLES

The present invention is described in more detail below with reference to Examples; however, the present invention is not limited to these Examples.

Evaluation Method

Each measurement was performed by the following methods.

(1) Volume Average Particle Diameter

The volume average particle diameter was determined using a laser diffraction particle size distribution analyzer (produced by Shimadzu Corporation, model: SALD-2300).

(2) Tensile Strength of Molded Article

A polyisoprene-containing latex composition was produced under the conditions described in each of the Examples and the Comparative Examples. The obtained latex composition was stored in such a manner that the composition was allowed to stand at 25° C. At each of the time points of day 1 (corresponding to 1 day after the production), day 8 (corresponding to 8 days after the production), and day 14 (corresponding to 14 days after the production) of storage, a molded article was prepared by the following process, and the tensile strength of the molded article was measured. The day on which the latex composition was produced was defined as day 0 of storage. Based on this, the number of days of storage of the latex composition was managed. The tensile strength of the molded article was measured based on JIS a K6251:2010.

A ceramic plate (200 mm×80 mm×5 mm) was washed with distilled water, suspended for 5 minutes in an oven (produced by ESPEC Corp., model: PVH-231) whose internal temperature was set to 100° C., and dried. The ceramic plate was then removed from the oven, and cooled to 25° C.

The ceramic plate was dipped for 30 seconds in a coagulant solution containing 15.0 mass % calcium nitrate, 5.0 mass % calcium carbonate, and 80.0 mass % distilled water. Subsequently, this plate was removed, and suspended for 20 seconds. The ceramic plate was then suspended for 5 minutes in an oven whose internal temperature was set to 100° C., to attach the coagulant to the plate. Thereafter, the ceramic plate with the coagulant attached thereto was removed from the oven, and suspended for 5 minutes in a room adjusted to 25° C.

The ceramic plate with the coagulant attached thereto was dipped for 30 seconds in the latex composition stored for a predetermined period of time, and then suspended for 2 minutes in a room adjusted to 25° C. to form a gel-like film on the surface of the ceramic plate.

The ceramic plate with the gel-like film was immersed for 5 minutes in warm water set at 60° C., and then suspended for 1 minute in a room adjusted to 25° C. Thereafter, the ceramic plate with the gel-like film was suspended for 30 minutes in an oven set at 100° C. for vulcanization treatment. Subsequently, the ceramic plate with the film was removed from the oven, and cooled to 25° C. The film was removed from the ceramic plate while talc was sprayed on both sides of the film. Excess talc attached to the film was removed with an air-blow gun to obtain a film-like molded article.

The obtained molded article was stamped into a No. 3 dumbbell shape to prepare a test piece. The obtained test piece was pulled at a pull rate of 500 mm/min with a tensile tester (produced by Shimadzu Corporation, model: Autograph AGS-J), and the tensile strength (unit: MPa) immediately before breaking was measured. The thickness of the molded article was 0.25 to 0.30 mm.

Preparation of Raw Material

The raw materials that can be used to prepare the latex compositions of the Examples and the Comparative Examples are described below.

Raw Material (A)

1.0 parts by mass of potassium hydroxide and 99.0 parts by mass of distilled water were mixed to prepare a 1.0 mass % potassium hydroxide aqueous solution.

Raw Material (B)

10.0 parts by mass of casein sodium (a reagent sold by Wako Pure Chemical Industries, Ltd.) and 90.0 parts by mass of distilled water were mixed to prepare a 10.0 mass % casein sodium aqueous solution.

Raw Material (C)

23.8 parts by mass of 2,2'-methylenebis(4-methyl-6-tert-butylphenol) (produced by Ouchi Shinko Chemical Industrial Co., Ltd.; trade name: NOCRAC NS-6), 0.2 parts by mass of an 18.0 mass % potassium oleate aqueous solution (produced by NOF Corporation, trade name: NONSOUL OK-1), 4.8 parts by mass of a 25.0 mass % high-molecular-weight sodium polycarboxylate aqueous solution (produced by NOF Corporation, trade name: POLYSTER OM), and 71.3 parts by mass of distilled water were mixed using a wet bead mill (produced by AIMEX Co., Ltd., model: RMB) to prepare a 23.8 mass % 2,2'-methylenebis(4-methyl-6-tert-butylphenol) aqueous dispersion.

Raw Material (D)

23.6 parts by mass of zinc oxide (produced by Seido Chemical Industry Co., Ltd., trade name: Zinc Oxide Type 2), 1.4 parts by mass of sodium β-naphthalene sulfonic acid formalin condensate (produced by Kao Corporation, trade name: DEMOL N), 0.2 parts by mass of an 18.0 mass % potassium oleate aqueous solution (produced by NOF Corporation, trade name: NONSOUL OK-1), and 74.8 parts by mass of distilled water were mixed using the wet bead mill described above to prepare a 23.6 mass % zinc oxide aqueous dispersion.

Raw Material (E)

23.6 parts by mass of colloidal sulfur (produced by Hosoi Chemical Industry Co., Ltd., trade name: Colloidal Sulfur), 1.4 parts by mass of sodium β-naphthalene sulfonic acid formalin condensate (produced by Kao Corporation, trade name: DEMOL N), 0.2 parts by mass of an 18.0 mass % potassium oleate aqueous solution (produced by NOF Corporation, trade name: NONSOUL OK-1), and 74.8 parts by mass of distilled water were mixed using the wet bead mill described above to prepare a 23.6 mass % colloidal sulfur aqueous dispersion.

Raw Material (F)

19.0 parts by mass of zinc ethylphenyldithiocarbamate (produced by Ouchi Shinko Chemical industrial Co., Ltd., trade name: NOCCELER PX), which is the component (a), 0.2 parts by mass of an 18.0 mass % potassium oleate aqueous solution (produced by NOF Corporation, trade name: NONSOUL OK-1), 3.8 parts by mass of a 25.0 mass % high-molecular-weight sodium polycarboxylate aqueous solution (produced by NOF Corporation, trade name: POLYSTER OM), and 77.0 parts by mass of distilled water were mixed using the wet bead mill described above to prepare a 19 mass % zinc ethylphenyldithiocarbamate aqueous dispersion. The volume average particle diameter of zinc ethylphenyldithiocarbamate in the aqueous dispersion was 0.75 µm.

Raw Material (G)

19.0 parts by mass of 1-o-tolylbiguanide (produced by Ouchi Shinko Chemical Industrial Co., Ltd., trade name: NOCCELER BG), which is the component (b), 0.2 parts by mass of an 18.0 mass % potassium oleate aqueous solution (produced by NOF Corporation, trade name: NONSOUL OK-1), 3.8 parts by mass of a 25.0 mass % high-molecular-weight sodium polycarboxylate aqueous solution (produced by NOF Corporation, trade name: POLYSTER OM), and 77.0 parts by mass of distilled water were mixed using the wet bead mill described above to prepare a 19 mass % 1-o-tolylbiguanide aqueous dispersion. The volume average particle diameter of 1-o-tolylbiguanide in the aqueous dispersion was 3.3 µm.

Raw Material (H)

19.0 parts by mass of zinc diethyldithiocarbamate (produced by Ouchi Shinko Chemical Industrial Co., Ltd., trade name: NOCCELER EZ), 0.2 parts by mass of an 18.0 mass % potassium oleate aqueous solution (produced by NOF Corporation, trade name: NONSOUL OK-1), 3.8 parts by mass of a 25.0 mass % high-molecular-weight sodium polycarboxylate aqueous solution (produced by NOF Corporation, trade name: POLYSTER OM), and 77.0 parts by mass of distilled water were mixed using the wet bead mill described above to prepare a 19 mass % zinc diethyldithiocarbamate aqueous dispersion. The volume average particle diameter of zinc diethyldithiocarbamate in the aqueous dispersion was 0.65 µm.

Raw Material (I)

19.0 parts by mass of zinc dibutyldithiocarbamate (produced by Ouchi Shinko Chemical Industrial Co., Ltd., trade name: NOCCELER BZ), 0.2 parts by mass of an 18.0 mass % potassium oleate aqueous solution (produced by NOF Corporation, trade name: NONSOUL OK-1), 3.8 parts by mass of a 25.0 mass % high-molecular-weight sodium polycarboxylate aqueous solution (produced by NOF Corporation, trade name: POLYSTER OM), and 77.0 parts by mass of distilled water were mixed using the wet bead mill described above to prepare a 19 mass % zinc dibutyldithiocarbamate aqueous dispersion. The volume average particle diameter of zinc dibutyldithiocarbamate in the aqueous dispersion was 2.6 µm.

Raw Material (J)

19.0 parts by mass of 1,3-diphenylguanidine (produced by Ouchi Shinko Chemical Industrial Co., Ltd., trade name: NOCCELER D), 0.2 parts by mass of an 18.0 mass % potassium oleate aqueous solution (produced by NOF Corporation, trade name: NONSOUL OK-1), 3.8 parts by mass of a 25.0 mass % high-molecular-weight sodium polycarboxylate aqueous solution (produced by NOF Corporation, trade name: POLYSTER OM), and 77.0 parts by mass of distilled water were mixed using the wet bead mill described above to prepare a 19 mass % 1,3-diphenylguanidine aqueous dispersion. The volume average particle diameter of 1,3-diphenylguanidine in the aqueous dispersion was 0.55 µm.

Raw Material (K)

19.0 parts by mass of 1,3-di-o-tolylguanidine (produced by Ouchi Shinko Chemical Industrial Co., Ltd., trade name: NOCCELER DT), 0.2 parts by mass of an 18.0 mass % potassium oleate aqueous solution (produced by NOF Corporation, trade name: NONSOUL OK-1), 3.8 parts by mass of a 25.0 mass % high-molecular-weight sodium polycarboxylate aqueous solution (produced by NOF Corporation, trade name: POLYSTER OM), and 77.0 parts by mass of distilled water were mixed using the wet bead mill described above to prepare a 19 mass % 1,3-di-o-tolylguanidine aqueous dispersion. The volume average particle diameter of 1,3-di-o-tolylguanidine in the aqueous dispersion was 1.5 μm.

Example 1

291.8 parts by mass of a synthetic polyisoprene latex (average particle diameter: 1.3 μm, solids concentration: 65.0 mass %, dispersion medium: water) was placed in a 1.0 L polypropylene beaker. While stirring the content of the polypropylene beaker using a stirrer equipped with a 4-blade pitch paddle, 19.0 parts by mass (0.10 parts by mass per 100 parts by mass of polyisoprene) of the 1.0 mass % potassium hydroxide aqueous solution (raw material (70), 8.4 parts by mass (0.44 parts by mass per 100 parts by mass of polyisoprene) of the 10.0 mass % casein sodium aqueous solution (raw material (B)), 16.0 parts by mass (2.00 parts by mass per 100 parts by mass of polyisoprene) of the 23.8 mass % 2,2'-methylenebis(4-methyl-6-tert-butylphenol) aqueous dispersion (raw material (C)), 2.0 parts by mass (0.25 parts by mass per 100 parts by mass of polyisoprene) of the 23.6 mass % zinc oxide aqueous dispersion (raw material (D)), 9.7 parts by mass (1.20 parts by mass per 100 parts by mass of polyisoprene) of the 23.6 mass % sulfur aqueous dispersion (raw material (E)), 4.0 parts by mass (0.40 parts by mass per 100 parts by mass of polyisoprene) of the 19 mass % zinc ethylphenyldithiocarbamate aqueous dispersion. (raw material (F)), 8.0 parts by mass (0.80 parts by mass per 100 parts by mass of polyisoprene) of the 19 mass % 1-o-tolylbiguanide aqueous dispersion (raw material (G)), and 141.2 parts by mass of distilled water were added to the polypropylene beaker to obtain a latex composition having a solids concentration of 40.0 mass %.

Example 2

The procedure of Example 1 was repeated, except that the amount of raw material (F) was 3.0 parts by mass (0.30 parts by mass per 100 parts by mass of polyisoprene) and the amount of raw material (G) was 9.0 parts by mass (0.90 parts by mass per 100 parts by mass of polyisoprene), thereby obtaining a latex composition having a solids concentration of 40.0 mass %.

Example 3

The procedure of Example 1 was repeated, except that the amount of raw material (F) was 5.0 parts by mass (0.50 parts by mass per 100 parts by mass of polyisoprene) and the amount of raw material (G) was 7.0 parts by mass (0.70 parts by mass per 100 parts by mass of polyisoprene), thereby obtaining a latex composition having a solids concentration of 40.0 mass %.

Example 4

The procedure of Example 1 was repeated, except that the amount of raw material (F) was 6.0 parts by mass (0.60 parts by mass per 100 parts by mass of polyisoprene) and the amount of raw material (G) was 6.0 parts by mass (0.60 parts by mass per 100 parts by mass of polyisoprene), thereby obtaining a latex composition having a solids concentration of 40.0 mass %.

Comparative Example 1

The procedure of Example 1 was repeated, except that 6.0 parts by mass (0.60 parts by mass per 100 parts by mass of polyisoprene) of the 19 mass % zinc diethyldithiocarbamate aqueous dispersion (raw material (H)) was used in place of raw material (F) and the amount of raw material (G) was 6.0 parts by mass (0.60 parts by mass per 100 parts by mass of polyisoprene), thereby obtaining a latex composition having a solids concentration of 40.0 mass %.

Comparative Example 2

The procedure of Example 1 was repeated, except that 6.0 parts by mass (0.60 parts by mass per 100 parts by mass of polyisoprene) of the 19 mass % zinc dibutyldithiocarbamate aqueous dispersion (raw material (I) was used in place of raw material (F) and the amount of raw material (G) was 6.0 parts by mass (0.60 parts by mass per 100 parts by mass of polyisoprene), thereby obtaining a latex composition having a solids concentration of 40.0 mass %.

Comparative Example 3

The procedure of Example 1 was repeated, except that the amount of raw material (F) was 6.0 parts by mass (0.60 parts by mass per 100 parts by mass of polyisoprene) and 6.0 parts by mass (0.6 parts by mass per 100 parts by mass of polyisoprene) of the 19 mass % 1,3-diphenylguanidine aqueous dispersion (raw material (J)) was used in place of raw material (G), thereby obtaining a latex composition having a solids concentration of 40.0 mass %.

Comparative Example 4

The procedure of Example 1 was repeated, except that the amount of raw material (F) was 6.0 parts by mass (0.60 parts by mass per 100 parts by mass of polyisoprene) and 6.0 parts by mass (0.60 parts by mass per 100 parts by mass of polyisoprene) of the 19 mass % 1,3-di-o-tolylguanidine aqueous dispersion (raw material (K) was used in place of raw material (G), thereby obtaining a latex composition having a solids concentration of 40.0 mass %.

Comparative Example 5

The procedure of Example 1 was repeated, except that 6.0 parts by mass (0.60 parts by mass per 100 parts by mass of polyisoprene) of the 19 mass % zinc diethyldithiocarbamate aqueous dispersion (raw material (H)) was used in place of raw material (F) and 6.0 parts by mass (0.60 parts by mass per 100 parts by mass of polyisoprene) of the 19 mass % 1,3-diphenylguanidine aqueous dispersion. (raw material (C)) was used in place of raw material (G), thereby obtaining a latex composition having a solids concentration of 40.0 mass %.

Comparative Example 6

The procedure of Example 1 was repeated, except that 6.0 parts by mass (0.60 parts by mass per 100 parts by mass of polyisoprene) of the 19 mass % zinc diethyldithiocarbamate aqueous dispersion (raw material (H)) was used in place of raw material (F) and 6.0 parts by mass (0.60 parts by mass per 100 parts by mass of polyisoprene) of the 19 mass % 1,3-di-o-tolylguanidine aqueous dispersion (raw material (K)) was used in place of raw material (C), thereby obtaining a latex composition having a solids concentration of 40.0 mass %.

Comparative Example 7

The procedure of Example 1 was repeated, except that 6.0 parts by mass (0.60 parts by mass per 100 parts by mass of polyisoprene) of the 19 mass % zinc dibutyldithiocarbamate aqueous dispersion (raw material (1)) was used in place of raw material (F) and 6.0 parts by mass (0.60 parts by mass per 100 parts by mass of polyisoprene) of the 19 mass % 1,3-diphenylguanidine aqueous dispersion (raw material (J)) was used in place of raw material (G), thereby obtaining a latex composition having a solids concentration of 40.0 mass %.

Comparative Example 8

The procedure of Example 1 was repeated, except that 6.0 parts by mass (0.60 parts by mass per 100 parts by mass of polyisoprene) of the 19 mass % zinc dibutyldithiocarbamate aqueous dispersion (raw material (I)) was used in place of raw material (F) and 6.0 parts by mass (0.60 parts by mass per 100 parts by mass of polyisoprene) of the 19 mass % 1,3-di-o-tolylguanidine aqueous dispersion. (raw material (K) was used in place of ram material (G) thereby obtaining a latex composition having a solids concentration of 40.0 mass %.

Comparative Example 9

The procedure of Example 1 was repeated, except that 4.0 parts by mass (0.40 parts by mass per 100 parts by mass of polyisoprene) of the 19 mass % zinc dibutyldithiocarbamate aqueous dispersion (raw material (I)) was used in place of raw material (F), thereby obtaining a latex composition having a solids concentration of 40.0 mass %.

Comparative Example 10

The procedure of Example 1 was repeated, except that 8.0 parts by mass (0.8 parts by mass per 100 parts by mass of polyisoprene) of the 19 mass % 1,3-diphenylguanidine aqueous dispersion (raw material (J)) was used in place of raw material (G), thereby obtaining a latex composition having a solids concentration of 40.0 mass %.

Comparative Example 11

The procedure of Example 1 was repeated, except that 8.0 parts by mass (0.80 parts by mass per 100 parts by mass of polyisoprene) of the 19 mass % 1,3-di-o-tolylguanidine aqueous dispersion (raw material (K)) was used in place of raw material (G), thereby obtaining a latex composition having a solids concentration of 40.0 mass %.

Comparative Example 12

The procedure of Example 1 was repeated, except that 4.0 parts by mass (0.40 parts by mass per 100 parts by mass of polyisoprene) of the 19 mass % zinc diethyldithiocarbamate aqueous dispersion (raw material (H)) was used in place of raw material (F) and 8.0 parts by mass (0.80 parts by mass per 100 parts by mass of polyisoprene) of the 19 mass % 1,3-diphenylguanidine aqueous dispersion. (raw material (J)) was used in place of raw material (G) thereby obtaining a latex composition having a solids concentration of 40.0 mass %.

Comparative Example 13

The procedure of Example 1 was repeated, except that 4.0 parts by mass (0.40 parts by mass per 100 parts by mass of polyisoprene) of the 19 mass % zinc diethyldithiocarbamate aqueous dispersion (raw material (H)) was used in place of raw material (F) and 8.0 parts by mass (0.80 parts by mass per 100 parts by mass of polyisoprene) of the 19 mass % 1,3-di-o-tolylguanidine aqueous dispersion. (raw material (K)) was used in place of ram material (C), thereby obtaining a latex composition having a solids concentration of 40.0 mass %.

Comparative Example 14

The procedure of Example 1 was repeated, except that 4.0 parts by mass (0.40 parts by mass per 100 parts by mass of polyisoprene) of the 19 mass % zinc dibutyldithiocarbamate aqueous dispersion (raw material (I)) was used in place of raw material (F) and 8.0 parts by mass (0.80 parts by mass per 100 parts by mass of polyisoprene) of the 19 mass % 1,3-diphenylguanidine aqueous dispersion (raw material (J)) was used in place of raw material (G), thereby obtaining a latex composition having a solids concentration of 40.0 mass %.

Comparative Example 15

The procedure of Example 1 was repeated, except that 4.0 parts by mass (0.40 parts by mass per 100 parts by mass of polyisoprene) of the 19 mass % zinc dibutyldithiocarbamate aqueous dispersion (raw material (I)) was used in place of raw material (F) and 8.0 parts by mass (0.80 parts by mass per 100 parts by mass of polyisoprene) of the 19 mass % 1,3-di-o-tolylguanidine aqueous dispersion (raw material (K)) was used in place of raw material (C), thereby obtaining a latex composition having a solids concentration of 40.0 mass %.

Reference Example 1

The procedure of Example 1 was repeated, except that the amount of raw material (F) was 2.0 parts by mass (0.20 parts by mass per 100 parts by mass of polyisoprene) and the amount of raw material (G) was 10.0 parts by mass (1.00 parts by mass per 100 parts by mass or polyisoprene), thereby obtaining a latex composition having a solids concentration of 40.0 mass %.

Reference Example 2

The procedure of Example 1 was repeated, except that the amount of raw material (F) was 7.0 parts by mass (0.70 parts by mass per 100 parts by mass of polyisoprene) and the amount of raw material (G) was 5.0 parts by mass (0.50 parts by mass per 100 parts by mass of polyisoprene), thereby obtaining a latex composition having a solids concentration of 40.0 mass %.

Evaluation Results

Table 1 shows the tensile strength of molded articles obtained from the polyisoprene latex compositions obtained in the Examples and the Comparative Examples.

TABLE 1

| | Thickness of molded article (mm) | Tensile strength of molded article (MPa) | | | |
|---|---|---|---|---|---|
| | | 1-day storage | 8-day storage | 11-day storage | 14-day storage |
| Example 1 | 0.26 | 28.9 | 28.9 | 28.2 | 27.0 |
| Example 2 | 0.27 | 26.6 | 26.7 | 29.7 | 29.8 |
| Example 3 | 0.29 | 32.6 | 27.4 | 24.9 | — |
| Example 4 | 0.27 | 31.9 | 27.4 | 22.9 | — |
| Reference Example 1 | 0.26 | 19.0 | — | — | — |
| Reference Example 2 | 0.26 | 30.0 | 20.1 | — | — |
| Comparative Example 1 | 0.29 | 30.7 | 18.6 | — | — |
| Comparative Example 2 | 0.25 | 23.5 | 12.3 | — | — |
| Comparative Example 3 | 0.26 | 28.5 | 20.6 | — | — |
| Comparative Example 4 | 0.26 | 25.4 | 19.3 | — | — |
| Comparative Example 5 | 0.25 | 31.4 | 21.8 | — | — |
| Comparative Example 6 | 0.27 | 32.2 | 22.0 | — | — |
| Comparative Example 7 | 0.28 | 30.8 | 15.2 | — | — |
| Comparative Example 8 | 0.27 | 31.6 | 17.0 | — | — |
| Comparative Example 9 | 0.28 | 25.5 | 12.7 | — | — |
| Comparative Example 10 | 0.26 | 23.6 | 20.9 | — | — |
| Comparative Example 11 | 0.26 | 16.0 | 11.1 | — | — |
| Comparative Example 12 | 0.26 | 30.5 | 21.3 | — | — |
| Comparative Example 13 | 0.26 | 24.1 | 16.1 | — | — |
| Comparative Example 14 | 0.27 | 31.8 | 16.2 | — | — |
| Comparative Example 15 | 0.28 | 32.7 | 16.5 | — | — |

The results in Table 1 showed that even when a molded article was obtained using the latex composition of each of the Examples 8 days or more (for example, 11 days or more) after the start of storage, the tensile strength of the molded article did not show a large decrease compared to that of the molded article obtained after storage for 1 day; in contrast, the tensile strength of the molded article obtained using the latex composition of each of the Comparative Examples 8 days after the start of storage showed a large decrease compared to that of the molded article obtained after storage for 1 day.

It was thus demonstrated that a molded article of a latex composition containing the component (a) (zinc ethylphenyldithiocarbamate) and the component (b) (1-o-tolylbiguanide) as essential components has high tensile strength; and that even after the latex composition is stored for a longer period of time than before, a decrease is the tensile strength of the obtained molded article is suppressed.

The invention claimed is:

1. A polyisoprene-containing latex composition comprising the following components (a) and (b):
   (a) zinc ethylphenyldithiocarbamate; and
   (b) 1-o-tolylbiguanide.

2. The latex composition according to claim 1, wherein the content of the component (a) is 0.3 to 0.6 parts by mass per 100 parts by mass of polyisoprene.

3. The latex composition according to claim 1, wherein the content of the component (b) is 0.6 to 0.9 parts by mass per 100 parts by mass of polyisoprene.

4. The latex composition according to claim 1, wherein the total content of the component (a) and the component (b) is 0.9 to 1.5 parts by mass per 100 parts by mass of polyisoprene.

5. The latex composition according to claim 1, wherein the content of the component (a) is 33 to 100 parts by mass per 100 parts by mass of the component (b).

6. A molded article comprising a vulcanizate of the latex composition according to claim 1.

7. A method for producing a molded article, comprising vulcanizing the latex composition according to claim 1 to obtain a molded article.

* * * * *